Patented June 30, 1942

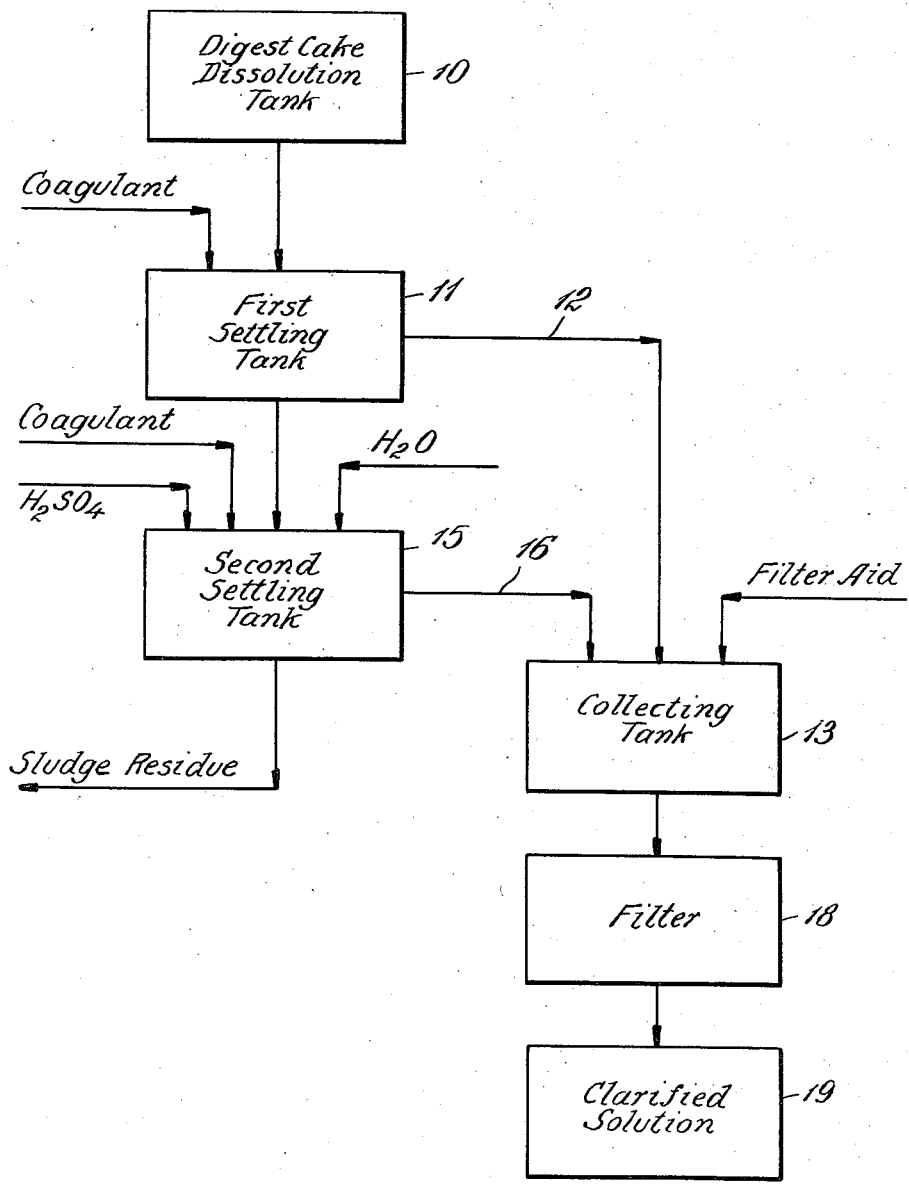

2,287,861

UNITED STATES PATENT OFFICE 2,287,861

TREATMENT OF TITANIUM SOLUTIONS

L'Roche G. Bousquet, Baldwin, and Maxwell J. Brooks, New York, N. Y., assignors to General Chemical Company, New York, N. Y., a corporation of New York Application March 29, 1940, Serial No. 326,668

4 Claims. (Cl. 23—117)

This invention relates to improvements in processes for manufacture of titanium oxide pigments.

Customary commercial procedure for making titanium oxide pigments, for example from titanium sulfate solutions, involves five fairly well-defined stages. In the first, titaniferous raw material such as ilmenite ore is digested with sulfuric acid to form a solid mass containing titanium sulfate, ferrous and ferric sulfates, and variable amounts of unattacked ore and gangue. The digest cake is water treated to form a mass comprising titanium sulfate and ferrous and ferric sulfates in solution, and undissolved solids in suspension. Metallic iron is usually added to reduce ferric sulfate to ferrous. The second stage consists in clarifying the liquor to separate unreacted ore, gangue, and slime residues. The clarified liquor, designated a stock titanium sulfate solution, is stored prior to use in the third main stage, the hydrolysis operation, result of which is production of solid crude metatitanic acid. Fourth, crude metatitanic acid is ordinarily conditioned, and lastly, the metatitanic acid is calcined at high temperature to form the final titanium oxide pigment product.

In customary commercial scale operations, stock titanium sulfate solution is often held in storage for substantial time interval prior to use in the hydrolysis step. Hence, satisfactory stock solution should be crystalloidal and contain no colloidal titanium the presence of which induces hydrolysis. Otherwise, the stock solution prematurely hydrolyzes while in storage and becomes of little practical value. In order to produce stock solutions which will not prematurely hydrolyze and for the further purpose of effecting commercially feasible recovery of titanium from ore, the amount of sulfuric acid employed in the ore-acid digest is not less than a certain minimum. The acid needed to accomplish these ends is usually sufficient for production of a clarified crystalloidal solution having acidity factor not less than about 40%, and more customarily of the order of 55 to 80%.

As known in the art relating to production and use of titanium sulfate solutions, percent "acidity factor" or "factor of acidity" (represented by F. A.) of a titanium sulfate solution is the ratio (multiplied by 100) of the so-called free $H_2SO_4$, (i. e. acid not combined with bases or with titanium as $TiOSO_4$) and the titanium equivalent acid based on $TiOSO_4$, (i. e. the acid constituent of $TiOSO_4$ as such). Free acid plus acid combined with titanium to form $TiOSO_4$ as such is designated "active acid." In terminology of the art, zero F. A. represents a condition in which all titanium in solution is present as titanyl sulfate ($TiOSO_4$), and 100% F. A. represents a condition in which all titanium is present as normal tetravalent titanium disulfate, $Ti(SO_4)_2$. Titanium sulfate solution containing less acid than needed to combine with bases other than titanium and to form $TiOSO_4$ with the titanium present is designated as having minus acidity factor. For example, in a case where solution conditions are such that substantially all of the titanium has been precipitated out as hydrate, e. g. as a result of neutralization of all of the acid, F. A. of the mother liquor is about minus 100%. Similarly, F. A. of a titanium chloride solution is the ratio (multiplied by 100) of the so-called free HCl (i. e. acid not combined with bases or with titanium as $TiOCl_2$) and the titanium equivalent acid based on $TiOCl_2$ (i. e. the acid constituent of $TiOCl_2$ as such).

The present invention is directed to improvements in clarification of crystalloidal titanium salt solutions.

As stated, the mass, obtained by dissolving the ore-acid digest cake in water and reducing ferric iron to ferrous, comprises chiefly titanium and ferrous sulfates in solution and unattacked ore, gangue and difficultly removable slimes in suspension. While attempts have been made to clarify these crude solutions by filtration, because of operating difficulties and high maintenance costs, adopted commercial practice is to separate solids and slimes by settling and decantation. Accordingly, in standard operations crude titanium sulfate solution containing solid residues is run into a large settling vat, treated with coagulant, settled for long periods often several days, and supernatant relatively clear solution is drawn off. In best practice, not more than about 80–85% of the titanium sulfate can be recovered in a single settling operation, that is upwards of 15–20% of available water soluble titanium sulfate is left in the vat in more or less closely held relationship with unattacked ore, gangue and slimes of the settled sludge. Hence, recovery of the water soluble titanium sulfate from settling tank sludges, with respect to overall titanium recovery in the pigment making process as a whole, constitutes a matter of substantial importance to the operator.

Settled sludge has high solid matter content and from practicable viewpoint should be diluted appreciably with water to obtain a mass sufficiently fluid and workable to facilitate further recovery of titanium sulfate. One prior proposal to effect such recovery has been to subject the sludge to multi-stage countercurrent water leaching. Objections to this proposal are threefold. First, in a certain stage of the operation the liquid phase of the mass is highly diluted with water, reducing titanium and so-called "free acid" concentrations to such extent that substantial amount of titanium hydrolyzes and precipitates as solid titanium oxide (metatitanic acid). Once initiated, hydrolysis continues during all leaching stages, even though titanium and free acid concentrations may increase as the leaching stream approaches the liquid discharge end of the system. The outcome is precipitation of substantial quantities of titanium as solid metatitanic acid and loss of the same in the solid residue. Secondly, since some hydrolysis has taken place, leaching system effluent liquor contains some colloidal titanium which induces further hydrolysis with the result that the effluent is unstable and will continue to hydrolyze if sent to storage. Third, because of use of a relatively large volume of water in this operation, titanium and free acid concentrations of the effluent solution are so low that, even assuming suitable stability and absence of colloidal titanium, should the effluent be mixed (without an additional evaporation step) with the main titanium sulfate solution drawn off from the primary settling operation, the composite solution thus formed would have titanium and free acid concentrations lower than those suitable for use in most hydrolysis operations. The net result of this system is high operating costs and low titanium recovery from the sludge. According to another prior art proposal, sludge of the settling operation is diluted with water and filter-pressed. This proposal is subject to the same objections inherently involved in previously mentioned filter-pressing operation, namely, high installation and maintenance costs, and low recoveries.

The present general trend in the industry with respect to hydrolytic precipitation practice is toward use of lower acidity factor solutions, i. e., more basic titanium sulfate solutions. Accordingly, ore-acid digestion operations are regulated so that the crude liquors produced, containing soluble titanium sulfate and solid digestion residues, are correspondingly more basic. The more basic a solution, the greater the tendency to hydrolyze. Since water dilution of sludge of a relatively basic crude solution still further promotes undesired premature hydrolysis by decreasing titanium concentration and free acid concentration, it will be appreciated the problem of soluble titanium recovery in clarification operations becomes more acute.

The principal object of the present invention is provision of an improved method for recovery of soluble titanium salt associated with solid material. The invention particularly aims to provide procedure for treatment of material, e. g., sludges or filter cakes obtained by settling or filtration of so-called titanium salt solutions, in such a way as to effect high soluble titanium recovery in the form of solutions preferably of such high titanium and free acid concentrations and high acidity factor value that the recovered solutions are crystalloidal, do not hydrolyze on storage, and may, if desired, be incorporated with the primary solutions from the initial settling or filtering operations to form composite solutions suitable for hydrolysis. Another object is to provide a method by which improved titanium recoveries from materials of the type described may be had by use of the generally more practicable settling operation as distinguished from filter-pressing.

The invention and the objects and advantages thereof may be more fully understood from the following illustrative example of clarification of a stock titanium sulfate solution described in connection with the accompanying drawing showing diagrammatically apparatus which may be employed.

In practice of the invention, as applied to titanium sulfate liquors, ilmenite and sulfuric acid are digested in any suitable way. In tank 10 of the drawing, the digest cake was treated with water to dissolve water soluble salts including titanium sulfate. The mass was treated with metallic iron to reduce ferric sulfate to ferrous and form a small amount of titanous sulfate. The particular crude titanium sulfate liquor formed in tank 10, in the present example analyzed—

| | |
|---|---|
| $TTiO_2$ | 154 gpl. |
| $RTiO_2$ | 5 |
| TFe | 98.5 |
| $FH_2SO_4$ | 113.5 |
| $AH_2SO_4$ | 302.5 |
| $TH_2SO_4$ | 475 |
| F.A. | 60.1% |
| Residue | 28.8 |

In the above and following analyses, $TTiO_2$ represents total titanium concentration calculated as $TiO_2$, $RTiO_2$ represents reduced titanium sulfate (titanous sulfate), $TH_2SO_4$ represents total $H_2SO_4$, $FH_2SO_4$ represents free $H_2SO_4$, $AH_2SO_4$ represents active $H_2SO_4$, TFe represents total iron concentration calculated as Fe, and % F.A. represents factor of acidity. Digestion and dissolution were such that 89.5% of the titanium of the ore was converted to soluble titanium sulfate.

Crude solution along with all of the solid material was run into first settling tank 11, warmed slightly and treated with enough of a 10% water solution of glue to promote coagulation of slimes. The mass was settled for 36 hours, after which partially clarified solution constituting about 84% of the total liquid of the mass was decanted thru pipe 12 and run into collecting tank 13. The liquor in tank 13 analyzed—

| | |
|---|---|
| $TTiO_2$ | 152 gpl. |
| $RTiO_2$ | 4.9 |
| TFe | 97.1 |
| $TH_2SO_4$ | 468 |
| $FH_2SO_4$ | 112 |
| $AH_2SO_4$ | 298 |
| F.A. | 60.2% |
| Sp. gr. at 55° C. | 1.53 |
| Residue | Less than 3 gpl. |

Up to this point, procedure was in accordance with accepted practice. However, the improvements of this invention are especially suited for use in pigment making processes in which the titanium sulfate solutions used in the hydrolysis operation are of relatively low acidity factor, i. e. quite basic. Accordingly in the digestion step proportions of acid and ore were chosen to make a fairly low acidity factor titanium sulfate solution, e. g. about 60%, of composition suitable for hydrolysis to produce crude metatitanic acid.

The sludge remaining in the first settling tank 11 comprised about 10.7% solids and contained both soluble and insoluble titanium, some sulfuric acid, ferrous sulfate and insoluble residue. It is to the recovery of extractable titanium from a mass such as this sludge that the present invention is directed.

As stated, the commercially most feasible method for recovering soluble titanium salt solution from masses of the type described is by a settling operation. Hence the principal object was to develop a satisfactory recovery method in which settling might be employed. On account of the high solid material content of the sludge, it is commercially inexpedient to attempt titanium recovery without diluting with water to make the mass more fluid and workable in standard equipment. Generally, it might be said the usual run of commercial sludges should be diluted with approximately an equal volume of water in order to produce a mass which may be readily handled either by settling or filtering.

It will be understood the composition of the liquid phase of the mass left in tank 11 is about the same as that of the solution drawn into tank 13. Water dilution of the sludge effects two disadvantageous changes of such composition. To illustrate, assuming sludge dilution with an equal volume of water, it will be seen that titanium and free acid concentrations will both be reduced approximately 50%. Decrease of titanium and free acid concentrations are each conducive to formation of small amounts of colloidal titanium the presence of which renders the solution unstable and sooner or later effects appreciable hydrolysis of titanium with consequent precipitation of solid metatitanic acid which becomes admixed with any solid residue present. During investigations leading to development of the invention, in a case where a sludge of the type described was diluted with enough water to form a sufficiently fluid and workable mass, it was found that in settling times of 48, 72, 120 and 168 hours, total titanium (as $TiO_2$) in solution decreased from an initial 51 gpl. to 46, 35, 32, and 27 gpl. respectively, all of the precipitated titanium being lost as solid metatitanic acid associated with the ultimate gangue residue. In the settling of a diluted sludge according to prior knowledge, as titanium concentration decreases conditions for further hydrolysis become still more favorable, and the result is that in addition to loss of titanium as solid metatitanic acid, the recovered titanium sulfate is unstable and not suitable for storage. Furthermore, titanium concentration becomes so low that the titanium sulfate is not suitable for hydrolysis without an evaporation operation which, in order to prevent complete hydrolysis, would have to be carried out in expensive vacuum evaporators. Accordingly, it is evident that recovery of soluble titanium from sludges of the nature described by ordinary known methods of dilution along with settling or filtration is of little commercial importance. While a water diluted sludge might be filtered promptly after dilution the phenomena just discussed take place but to a lesser extent. However, installation and maintenance costs of filtration processes in a large scale operation are so high as to offset any advantages otherwise obtained.

To accomplish economic recovery of soluble titanium from the sludge of a primary settling operation, the problem presented was to work out procedure which would permit fairly substantial water dilution of the sludge and also use of standard settling equipment. With these features in view, it was necessary to evolve procedure such that hydrolysis of titanium would be substantially prevented, and preferably to make possible production of second settling operation liquor which would have titanium and free acid concentrations and acidity factor value high enough to permit mixing the relatively clear supernatant liquors of the first and second settling operations to form a composite liquor of composition such that the same could be stored and used in standard hydrolytic precipitation operations.

We have found these objects may be accomplished by treating the sludge with controlled amounts of acid and water. In carrying out the invention, the sludge is treated with acid (preferably sulfuric acid in the case of a sludge resulting from settling of a titanium sulfate solution) in amount to raise the acidity factor of the liquid phase of the mass to not less than 85%. By so doing we find it is possible to create in the mass titanum and free acid concentrations and acidity factor conditions which to a very marked degree prevent hydrolysis loss of titanium. After acid treatment, the sludge mass is diluted with water to create fluidity. Addition of water does not reduce acidity factor but does lower free acid concentration. As above explained, low free acid concentration is one of the features influencing hydrolysis of hydrolyzable titanium salt solutions. We find a second control factor for successful operation of the present process is limitation of the amount of diluting water to such an extent that the free acid concentration, calculated as equivalent sulfuric acid, of the liquid phase of the final diluted mass is not less than 35 gpl. To obtain the better results, in large scale operation, it is preferred to use acid enough to raise F. A. to not less than 100% and to limit amount of diluting water so that the free acid concentration, calculated as equivalent sulfuric acid, of the diluted mass does not fall below 55 gpl. If desired, still higher acidity factors and free acid concentrations may be used and still better soluble titanium recoveries obtained. Reference herein to the acidity factor or the free acid concentration of a mass which contains liquid and solid is intended to designate the F. A. and free acid concentration of the liquid phase of the mass.

The preferred embodiments of the invention also involve the order in which the sludge is treated with acid and water. It is undesirable to first dilute the sludge with the water to be used since addition of water alone to the sludge reduces both the titanium and free acid concentrations and may tend to initiate hydrolysis which once started continues regardless of any subsequent preventative measures. Although the calculated quantities of acid and water might be first mixed and the mixture added to the sludge, in order to minimize possibility of hydrolysis, it is preferred to first treat the sludge with the acid and then add the diluting water.

The sludge is transferred from tank 11 to a second settling tank 15 which may be equipped with an agitator. On account of varying chemical composition and solid matter content of commercial sludges it is not possible to state a comprehensive rule with respect to quantities of acid and water to be used in all situations. For given set of plant conditions, quantities of acid and water may be calculated, due regard being had for the above stated conditions with respect to acidity factor and free acid concentration of the ultimate diluted sludge. The acid employed may be of any suitable concentration, although it is advisable to use a relatively strong, say 66° Bé., acid so that the acidity factor and the free acid concentration of the sludge mass are raised sharply prior to water dilution to avoid any titanium hydrolysis tendencies which might be induced by use of dilute acid. Ordinarily, in the case of the usual run of commercial sludges, the volume of water used may be approximately the same as the volume of the sludge to be treated.

In the present example, the sludge in second settling tank 15 was treated with 98% sulfuric acid in amount to raise the acidity factor of the mass to 100%. The acidified slurry was then diluted with about an equal volume of water which gave a liquor analyzing—

| | |
|---|---|
| $TTiO_2$ | 56.4 gpl. |
| $RTiO_2$ | 1.8. |
| TFe | 36.0. |
| $TH_2SO_4$ | 201.2. |
| $FH_2SO_4$ | 69. |
| $AH_2SO_4$ | 138.0. |
| F. A. | 100%. |
| Residue | 43.4 gpl. |
| Sp. gr. at 40° C. | 1.22. |

The liquor was then treated with a 9% water solution of glue to facilitate slime coagulation. The mass was settled for about 48 hours, after which about 61% of the partially clarified solution was drawn off through pipe 16 and added to the liquor already in collecting tank 13. The composite liquor in tank 13 analyzed—

| | |
|---|---|
| $TTiO_2$ | 129.0 gpl. |
| $RTiO_2$ | 4.2. |
| TFe | 82.5. |
| $TH_2SO_4$ | 405.0. |
| $FH_2SO_4$ | 102.0. |
| $AH_2SO_4$ | 260.0. |
| F. A. | 64.6% |
| Residue | Less than 3. |
| Sp. gr. at 40° C. | 1.46. |

The combined decanted liquor in tank 13 was then treated with a small amount of filter-aid and filtered in filter 18. The filtrate collected in tank 19 was a brilliantly clear crystalloidal solution of the same composition as indicated immediately above except that the solid residue content was less than 0.01 gpl. The partially clarified solution in tank 13 represented recovery of 83.6% of the total titanium of the original ore and 93.8% of the titanium solubilized in the digest operation.

Optimum settling time intervals may vary widely depending upon such factors as the nature of the sludge, degree of dilution, and the amount of coagulant used. In work other than that detailed in the above example, in settling periods ranging from about 10 to about 70 hours, recoveries of 55 to 66% have been obtained from diluted sludges of acidity factors ranging from 85% to 180% and of free acid concentrations from 37 to 80 gpl. The advantages afforded by the invention with respect to prevention of titanium loss by hydrolysis are demonstrated by operations which show that, in the case of diluted sludge of 85% F. A. and free acid concentration of 37.6 gpl., when settling time was prolonged from 32 to 328 hours, titanium recovery was decreased from 61% to 58%. Where settling of a diluted sludge of 180% F. A. and free acid concentration of 80 gpl. was continued from 36 to 330 hours, titanium recovery was decreased from 65.5% to 64.5%, and in the case of a diluted sludge of 100% F. A. and free acid concentration of 44.5 gpl., when settling was continued from 38 to 328 hours, titanium recovery was decreased from 63% to 60.5%. These data show maximum recoveries in relatively short settling intervals, and more important, that practice of the invention minimizes recoverable titanium loss as metatitanic acid.

The invention is applicable to recovery of soluble titanium salt from materials other than the settled sludges referred to above. The principles of the invention may be employed, for example, to recover soluble titanium salt from the filter cake formed in an operation where the bulk of the solid matter is separated from a crude titanium sulfate solution by filtration rather than by settling and decantation. Further, the separation effected in settling tank 15 of the drawing may be brought about by filtering rather than by settling. Also, the invention may be applied to clarification of solutions other than titanium sulfate, for example to clarification of a titanium chloride solution or to clarification of a solution of mixed titanium salts. In practice of the invention, with respect to the acid to be used to raise the F. A. as indicated, any suitable acid (e. g., mineral acids such as sulfuric and hydrochloric) which functions to regulate the F. A. as desired may be employed. The acid ordinarily used is one the anion of which is the same as the anion of the titanium salt constituting the titanium salt solution. The diluting liquid used of course need not be pure water, but may be wash water or any suitable aqueous solution not containing deleterious impurities such as mother liquor from hydrolysis step.

We claim:

1. The method for clarifying a titanium salt solution of the group consisting of titanium sulfate and titanium chloride and having acidity factor less than 85% and containing solid material which comprises settling said solution with aid of coagulant, decanting relatively clear titanium salt solution from the bulk of the sludge residue, treating the sludge with acid of the group consisting of sulfuric and hydrochloric acids in amount so that the acidity factor of the liquid phase of the mass thus formed is not less than 100%, then introducing into said mass water in amount such that the free acid concentration of the liquid phase of the resulting mass is not less than 55 gpl. equivalent sulfuric acid, settling said resulting mass with the aid of coagulant, separating relatively clear titanium salt solution from settled solid material, combining said first and second mentioned relatively clear titanium salt solutions, incorporating filter-aid with the combined solution, and filtering the latter to separate residual solid material.

2. The method of clarifying a titanium salt solution of the group consisting of titanium sulfate and titanium chloride and having acidity factor less than 85% and containing solid material which comprises settling said solution, decanting relatively clear titanium salt solution from the bulk of the sludge residue, treating the sludge, without substantial heating, with acid of the group consisting of sulfuric and hydrochloric acids in amount so that the acidity factor of the liquid phase of the mass thus formed is increased to not less than 100%, then introducing into said mass water in amount such that the free acid concentration of the liquid phase of the resulting mass is not less than 55 gpl. equivalent sulfuric acid, settling said resulting mass, and separating relatively clear titanium salt solution from settled solid material.

3. The method for clarifying a titanium salt solution of the group consisting of titanium sulfate and titanium chloride and having acidity factor less than 85% and containing solid residue which has remained undissolved in a previous acid-titaniferous material digest operation included in production of said titanium salt solution, which method comprises separating relatively clear titanium salt solution from the bulk of the solid residue, treating the resultant residue, without substantial heating, with acid of the group consisting of sulfuric and hydrochloric acids in amount so that the acidity factor of the liquid phase of the mass thus formed is increased to not less than 100%, then introducing into said mass water in amount such that the free acid concentration of the liquid phase of the resulting mass is not less than 55 gpl. equivalent sulfuric acid, and separating relatively clear titanium salt solution from residual solid material.

4. The method for recovering soluble titanium salt from material resulting from separation of titanium salt solution, of the group consisting of titanium sulfate and titanium chloride and having acidity factor less than 85%, from the bulk of solid matter initially contained in said solution, which method comprises treating the material, without substantial heating, with acid of the group consisting of sulfuric and hydrochloric acids in amount so that the acidity factor of the liquid phase of the mass thus formed is increased to not less than 100%, and then introducing into said mass water in amount such that the free acid concentration of the liquid phase of the resulting mass is not less than 55 gpl. equivalent sulfuric acid and separating titanium salt solution from residual solid matter.

L'ROCHE G. BOUSQUET.
MAXWELL J. BROOKS.